(12) United States Patent
Hoppert et al.

(10) Patent No.: US 10,394,585 B2
(45) Date of Patent: Aug. 27, 2019

(54) MANAGING GUEST PARTITION ACCESS TO PHYSICAL DEVICES

(71) Applicant: Microsoft Technology Licensing, LLC, Redmond, WA (US)

(72) Inventors: Hadden Mark Hoppert, Bellevue, WA (US); Christopher L. Huybregts, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 119 days.

(21) Appl. No.: 15/451,943

(22) Filed: Mar. 7, 2017

(65) Prior Publication Data

US 2018/0260235 A1 Sep. 13, 2018

(51) Int. Cl.
| | |
|---|---|
| *G06F 12/00* | (2006.01) |
| *G06F 9/455* | (2018.01) |
| *G06F 3/06* | (2006.01) |
| *G06F 9/50* | (2006.01) |
| *G06F 12/1081* | (2016.01) |

(Continued)

(52) U.S. Cl.
CPC .......... *G06F 9/45545* (2013.01); *G06F 3/061* (2013.01); *G06F 3/068* (2013.01); *G06F 3/0622* (2013.01); *G06F 3/0644* (2013.01); *G06F 9/45558* (2013.01); *G06F 9/5077* (2013.01); *G06F 12/109* (2013.01); *G06F 12/1081* (2013.01); *G06F 12/0292* (2013.01); *G06F 2009/45579* (2013.01); *G06F 2212/1052* (2013.01); *G06F 2212/151* (2013.01); *G06F 2212/206* (2013.01); *G06F 2212/657* (2013.01)

(58) Field of Classification Search
CPC . G06F 2009/45579; G06F 2009/45587; G06F 9/45558; G06F 21/6218; G06F 2009/45583; G06F 2201/815; G06F 21/53; G06F 9/45533; G06F 3/0665; G06F 9/5077
USPC ........................................................ 711/112
See application file for complete search history.

(56) References Cited

U.S. PATENT DOCUMENTS

| | | |
|---|---|---|
| 2005/0132365 A1 | 6/2005 | Madukkarumukumana et al. |
| 2008/0005297 A1 | 1/2008 | Kjos et al. |

(Continued)

OTHER PUBLICATIONS

Waldspurger, et al., "I/O virtualization", In Magazine of Communications of the ACM, vol. 55 Issue 1, Jan. 2012, pp. 66-73.

(Continued)

*Primary Examiner* — Mardochee Chery

(57) ABSTRACT

A computing device includes a host, one or more guest partitions, and one or more physical devices. A physical device can be virtualized, at least in part, by the host and made available to the guest partitions. A physical device includes both a control plane and a data plane. The host provides direct access to at least part of the data plane of a physical device to a guest partition. However, the host virtualizes the control plane of the physical device, exposing a control plane for the physical device to the guest partition that is not the actual control plane of the physical device. Requests to access (e.g., read, write, modify, etc.) the control plane of the physical device are received by the host from the guest partition, and converted as appropriate to the control plane for the physical device.

20 Claims, 5 Drawing Sheets

(51) Int. Cl.
*G06F 12/109* (2016.01)
*G06F 12/02* (2006.01)

(56) References Cited

U.S. PATENT DOCUMENTS

| | | |
|---|---|---|
| 2008/0155223 A1* | 6/2008 | Hiltgen .............. G06F 9/45558 |
| | | 711/173 |
| 2008/0288661 A1 | 11/2008 | Galles |
| 2011/0179414 A1 | 7/2011 | Goggin et al. |
| 2012/0033673 A1 | 2/2012 | Goel |
| 2013/0085720 A1 | 4/2013 | Xie et al. |
| 2013/0282994 A1 | 10/2013 | Wires et al. |
| 2014/0130041 A1 | 5/2014 | Luxenberg et al. |
| 2014/0173600 A1 | 6/2014 | Ramakrishnan nair |
| 2014/0229769 A1 | 8/2014 | Abraham et al. |
| 2015/0178234 A1 | 6/2015 | Gantman et al. |
| 2015/0220354 A1 | 8/2015 | Nair |
| 2015/0317088 A1 | 11/2015 | Hussain et al. |

OTHER PUBLICATIONS

Nakajima, et al., "Optimizing virtual machines using hybrid virtualization", In Proceedings of the ACM Symposium on Applied Computing, Mar. 21, 2011, pp. 573-578.

Armand, et al., "Shared device driver model for virtualized mobile handsets", In Proceedings of the First Workshop on Virtualization in Mobile Computing, Jun. 17, 2008, pp. 12-16.

"International Search Report and Written Opinion Issued in PCT Application No. PCT/US18/020063", dated Apr. 24, 2018, 13 Pages.

* cited by examiner

MANAGING GUEST PARTITION ACCESS TO PHYSICAL DEVICES

BACKGROUND

As computing technology has advanced, designers have continuously found new ways to improve the performance of computing devices. This has resulted in computing devices that run faster, run with reduced power consumption, have smaller form factors, and so forth. While such improvements are beneficial to users, they are not without their problems. One such problem is that it can be difficult to design computing devices that provide the desired functionality while at the same time operate in a secure manner, protecting the computing devices from attack by malicious users or programs. Failure to provide such protections can lead to poor performance of the computing devices and/or leave the computing devices vulnerable to attack by malicious users or programs, resulting in user dissatisfaction with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a host of a computing device, a physical device to be made accessible to a guest partition of the computing device is identified. A first portion of the physical device is virtualized for access to the physical device by the guest partition, the first portion including at least part of a control plane for the physical device. Access to the first portion of the physical device are managed by the guest partition. The guest partition is allowed to directly access a second portion of the physical device, the second portion including at least part of a data plane for the physical device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
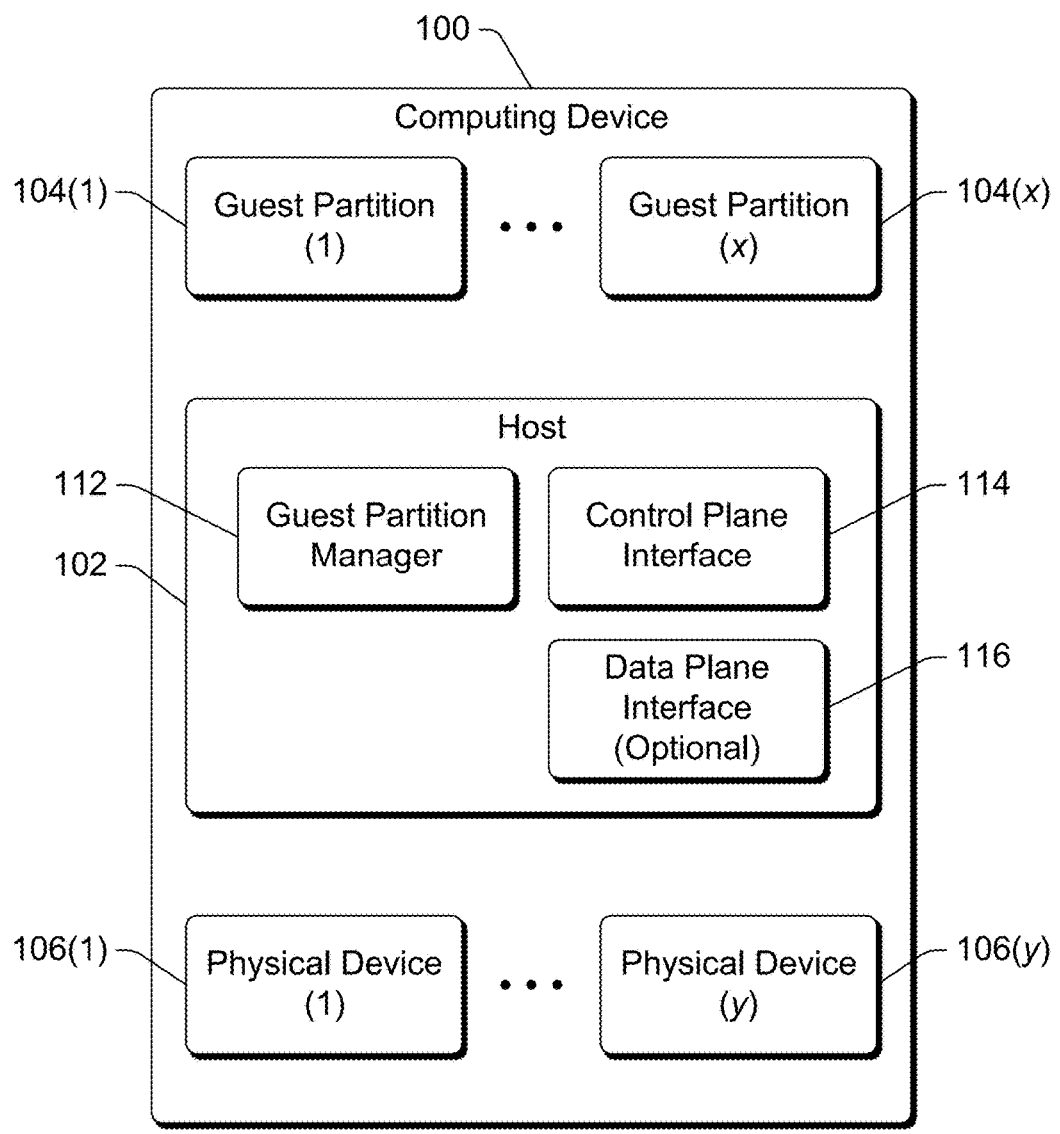
FIG. 1 is a block diagram illustrating an example computing device implementing the managing guest partition access to physical devices in accordance with one or more embodiments.

Managing guest partition access to physical devices is discussed herein. A computing device includes one or more guest partitions and a host. Each guest partition is isolated from other guest partitions, providing security by preventing programs running in one guest partition from accessing memory or programs in other guest partitions. A host in the computing device manages the guest partitions, including the creation of guest partitions.

The computing device also includes one or more physical devices. A physical device can be virtualized, at least in part, by the host and made available to the guest partitions. This allows each guest partition to access its own version of the physical device.

A physical device includes both a control plane and a data plane. The control plane refers to the manner in which programs interact with the physical device to configure or control the physical device, such as gathering information about the physical device, setting control or configuration values for the physical device, and so forth. Different memory addresses or address ranges can be associated with the control plane. The data plane refers to the manner in which the programs use the physical device, sending data to and/or receiving data from the physical device. Different memory addresses or address ranges can be associated with the data plane. It should be noted that the data plane and the control plane need not be physical constructs, and can be interleaved and all part of the same region of memory. For example, control planes can contain data locations and data planes can contain control locations.

Using the techniques discussed herein, the host provides direct access to at least part of the data plane of a physical device to a guest partition. This direct access allows programs running in the guest partition to directly write to and/or read from the physical device. The host need not virtualize the part of the data plane for which direct access is provided, increasing the speed with which a program in the guest partition can access that part of the data plane because no time or computation effort need be expended in virtualizing that part of the data plane.

However, the host does virtualize at least some of the control plane of the physical device. This virtualizing refers to the host exposing at least some of a control plane for the physical device to the guest partition that is not the actual control plane of the physical device. Requests to access (e.g., read, write, modify, etc.) the exposed control plane of the physical device are received by the host from the guest partition, and converted as appropriate to the control plane for the physical device. Thus, the guest partition does not have direct access to at least some of the control plane for the physical device.

The techniques discussed herein improve security of the computing device by restricting access to the control plane of the physical device by the guest partitions. The techniques further improve performance of the computing device by allowing the guest partitions to directly access the data plane of the physical device. Thus, programs running in the guest partition can directly (and thus quickly) send data to and/or receive data from the physical device on the data plane of the physical device, but are prevented from directly accessing the control plane of the physical device (and thus potentially interfering with the operation of the physical device).

FIG. 1 is a block diagram illustrating an example computing device 100 implementing the managing guest partition access to physical devices in accordance with one or more embodiments. Computing device 100 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet, augmented reality (AR) devices, virtual reality (VR) devices), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes a host 102, one or more (x) guest partitions 104(1), . . . , 104(x), and one or more (y) physical devices 106(1), . . . , 106(y). Each guest partition 104 refers to an isolated session that includes one or more components. These components include, for example, virtual devices (e.g., one or more processors, memory, storage devices), a base operating system (e.g., an operating system kernel), a user-mode environment, applications, and so forth. A base operating system component provides various different low level system services to components in the guest, such as session management, program execution, input/output services, resource allocation, and so forth. The base operating system component can be a full operating system, or alternatively only a portion of a full operating system (e.g., the base operating system component may be a very small component if the guest shares most of the operating system with the host (in particular, the kernel)). The user-mode environment component provides a runtime environment for applications in the guest (e.g., a Java Runtime Environment, a .NET framework, and so forth). The application component is an application that is desired (e.g., by a user, administrator, other program, etc.) to be run in the guest (e.g., a web service, a calculation engine, etc.).

One type of partition that a guest partition 104 can be implemented as is referred to as a process container. For a process container, the application processes within the guest run as if they were operating on their own individual system (e.g., computing device), which is accomplished using namespace isolation. The host 102 implements namespace isolation. Namespace isolation provides processes in a guest partition a composed view consisting of the shared parts of the host 102 and the isolated parts of the host that are specific to each container such as filesystem, configuration, network, and so forth.

Another type of guest that a guest partition 104 can be implemented as is referred to as a virtualized container. For a virtualized container, the virtualized container is run in a lightweight virtual machine that, rather than having specific physical memory of the computing device 100 assigned to the virtual machine, has virtual address backed memory pages. Thus, the memory pages assigned to the virtual machine can be swapped out to a page file. The use of a lightweight virtual machine provides additional security and isolation between processes running in a guest. Thus, whereas process containers use process isolation or silo-based process isolation to achieve their containment, virtualized containers use virtual machine based protection to achieve a higher level of isolation beyond what a normal process boundary can provide. A guest partition 104 may also be run in a virtual machine using physical memory of the computing device 100, and the techniques discussed herein used with the virtual machine. Such a virtual machine using physical memory allows for higher isolation, e.g., in situations where the use of virtual memory for the virtual machine is not desired because of performance or security concerns.

The host 102 includes a guest partition manager 112, a control plane interface 114, and optionally a data plane interface 116. The host 102 also manages one or more containers or virtual machines, illustrated as guest partitions 104. The guest partition manager 112 creates a guest partition in any of a variety of manners, such as building or generating a guest partition from scratch, by "cloning" a guest partition template (which refers to copying the guest partition template into memory of the computing device 100 to create a new guest partition 104), and so forth. While the newly created guest partition 104 is running, the host 102 manages the guest partition 104, for example determining when the guest partition 104 is to run (i.e., execute). The guest partition manager 112 also manages tear down or deletion of the guest partition 104 when the guest partition 104 is no longer needed or desired in the computing device 100.

The host 102 can be implemented in a variety of different manners. In one or more embodiments, the host 102 is implemented as a hypervisor. Additionally or alternatively, the host 102 is implemented as a host operating system (e.g., the host 102 can be implemented as a partition referred to as a host partition).

Each physical device 106 is a hardware device that is at least partially virtualized to the guest partitions 104. Although illustrated as part of the computing device 100, a physical device 106 can alternatively be separate from but coupled to the computing device 100. Physical devices 106 can be any of a variety of different types of devices that a program running in a guest partition 104 can communicate data to and/or receive data from. Examples of physical devices 106 include network interface cards, storage controllers, printers, graphics processors or chips, field-programmable gate arrays (FPGAs), and so forth.

In one or more embodiments, the physical devices 106 are memory mapped input/output (I/O) devices. A memory mapped I/O device refers to a device that includes one or more regions (e.g., memory, registers, etc.) that are associated with (also referred to as mapped to) physical memory of the computing device 100. A program running on the computing device 100 can access the one or more regions of the physical device 106 by accessing the physical memory of the computing device 100 associated with those one or more regions. For example, the physical device 106 can monitor an address bus of the computing device 100 and respond to any requests (e.g., return data that is requested to be read, store data that is requested to be written) targeting addresses in those one or more regions.

Each physical device 106 includes both a control plane and a data plane. The control plane refers to the manner in which programs running on the computing device 100 (including programs running in the guest partitions 104) interact with the physical device 106 to control the physical device 106, such as gathering information about the physical device 106, setting control or configuration values for the physical device 106, and so forth. In one or more embodiments, the control plane is included in the one or more regions that are associated with (also referred to as mapped to) physical memory of the computing device 100.

The data plane refers to the manner in which the programs running on the computing device 100 (including programs running in the guest partitions 104) use the physical device 106. This use of the physical device 106 includes sending data to the physical device 106 (e.g., writing data to the physical device 106) and/or receiving data from (e.g., reading data from the physical device 106). In one or more embodiments, the data plane is included in the one or more regions that are associated with (also referred to as mapped to) physical memory of the computing device 100.

Using the techniques discussed herein, the host 102 virtualizes at least part of the control plane of a physical device 106. Control planes of all physical devices 106 can be virtualized, or alternatively control planes of only some of the physical devices 106 can be virtualized. This virtualizing refers to the host 102 exposing a control plane for the physical device 106 to the guest partition 104 that is not the actual control plane of the physical device 116. The control plane interface 114 manages exposing a control plane for the physical device 116 to the guest partition 104, and managing access requests for the control plane received from the guest partition 104 (including programs running in the guest partition 104). Requests to access (e.g., read, write, modify, etc.) the control plane of the physical device 106 are received by the control plane interface 116 from the guest partition 104 and converted as appropriate to the control plane for the physical device. This conversion can be performed in various manners, as discussed in more detail below. Thus, the guest partition 104 does not have direct access to at least part of the control plane for the physical device 106.

The host 102 optionally allows direct access to at least part of the control plane of a physical device 106 to a guest partition 104. This direct access allows the guest partition 104 (and programs running in the guest partition 104) to directly write to and/or read from the physical device 106. Direct access to at least part of the control planes of all physical devices 106 can be allowed, or alternatively direct access to at least part of the control planes of only some of the physical devices 106 can be allowed. Thus the host 102 can allow direct access by a guest partition 104 to all of the physical device control plane 204, to only part of the physical device control plane 204, or to none of the physical device control plane 204. Parts (some or all) of the physical device control plane 204 for which direct access is not available to the guest partition 202 can be virtualized.

Similarly, the host 102 allows direct access to at least part of the data plane of a physical device 106 to a guest partition 104. This direct access allows the guest partition 104 (and programs running in the guest partition 104) to directly write to and/or read from the physical device 106. Direct access to at least part of the data planes of all physical devices 106 can be allowed, or alternatively direct access to at least part of the data planes of only some of the physical devices 106 can be allowed. Thus the host 102 can allow direct access by a guest partition 104 to all of the physical device data plane 206, to only part of the physical device data plane 206, or to none of the physical device data plane 206. Parts (some or all) of the physical device control data plane 206 for which direct access is not available to the guest partition 202 can be virtualized.

The host 102 optionally virtualizes part of the data plane of at least one physical device 106. Parts of data planes of all physical devices 106 can be virtualized, or alternatively parts of data planes of only some of the physical devices 106 can be virtualized. This virtualizing refers to the host 102 exposing part of a data plane for the physical device 106 to the guest partition 104 that is not the actual part of the data plane of the physical device 116. The data plane interface 116 manages exposing part of a data plane for the physical device 116 to the guest partition 104, and manages access requests for the part of the data plane received from the guest partition 104 (including programs running in the guest partition 104). Requests to access (e.g., read, write, modify, etc.) the part of the data plane of the physical device 106 are received by the data plane interface 116 from the guest partition 104 and converted as appropriate to the data plane for the physical device. This conversion can be performed in various manners, as discussed in more detail below.

Figure 2:
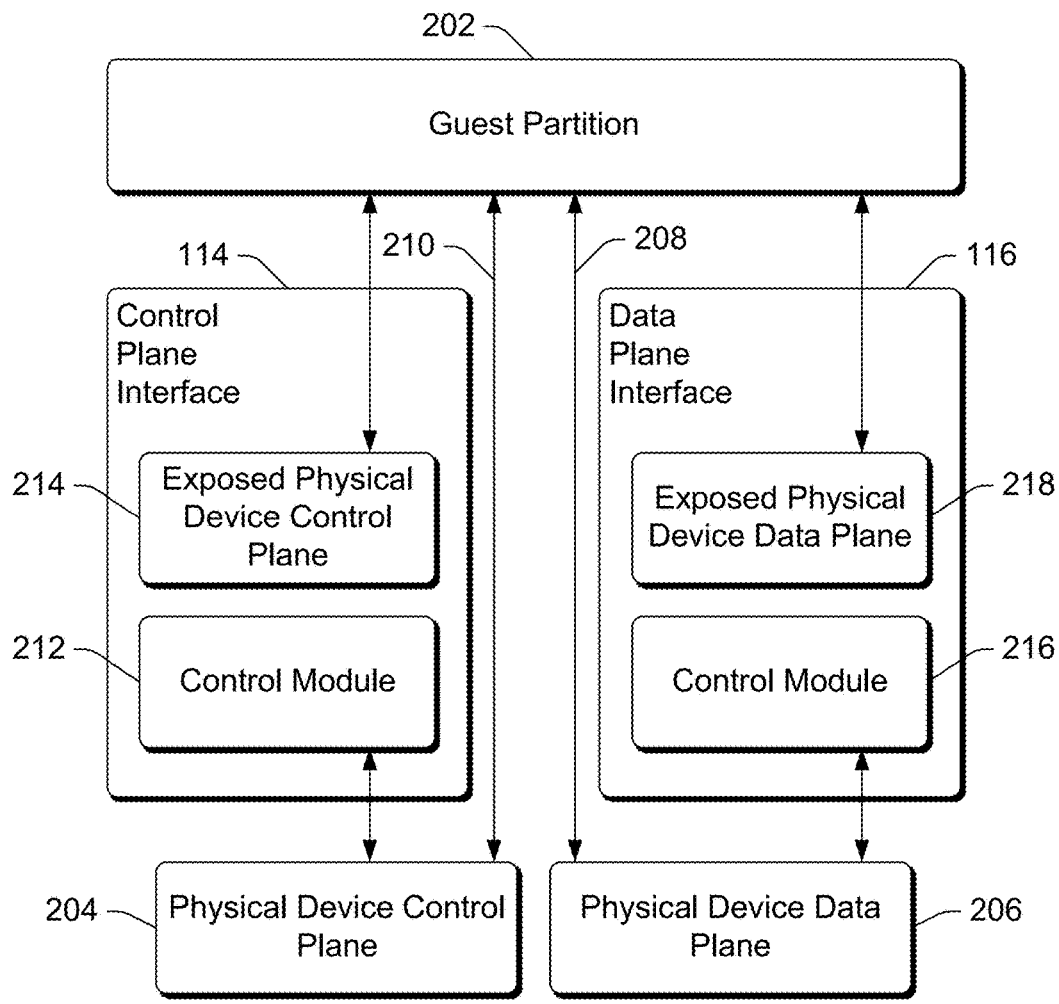
FIG. 2 is a block diagram illustrating an example of guest partition access to a physical device in accordance with one or more embodiments.

FIG. 2 is a block diagram illustrating an example of guest partition access to a physical device in accordance with one or more embodiments. The example of FIG. 2 includes a guest partition 202, a physical device control plane 204, and a physical device data plane 206. The guest partition 202 can be any of the guest partitions 104 of FIG. 1. The physical device control plane 204 is a control plane of, and the physical device data plane 206 is a data plane of, a physical device 106 of FIG. 1. The example of FIG. 2 also includes a control plane interface 114 and a data plane interface 116.

The guest partition 202 can directly access at least part of the physical device data plane 206, illustrated by arrow 208. It should be noted that references herein to the guest partition 202 directly accessing part of a physical device data plane 206 include programs running in the guest partition 202 directly accessing part of the physical device data plane. Optionally, the guest partition 202 can directly access at least part of the physical device control plane 204, illustrated by arrow 210. It should be noted that references herein to the guest partition 202 directly accessing part of a physical device control plane 204 include programs running in the guest partition 202 directly accessing part of the physical device data plane.

Direct access by a guest partition to a physical device makes the physical device visible to the guest partition. Direct access by the guest partition 202 to at least part of the physical device data plane 206 and/or physical device control plane 204 can be accomplished in a variety of different manners. In one or more embodiments, the computing device 100 implementing the guest partition 202, control plane interface 114, and data plane interface 116 includes a processor that supports direct access to the physical device by a guest partition. For example, the computing device 100 can include a processor that supports Intel® Virtualization Technology for Directed I/O (VT-d) technology, which provides direct access to the physical device by a guest partition.

The control plane interface 114 includes a control module 212 and an exposed physical device control plane 214. In one or more embodiments, at least part of the physical device control plane 204 is virtualized by the control plane interface 114 making an exposed physical device control plane 214 accessible to the guest partition 202. The exposed physical device control plane 214 appears to the guest partition 202 as if it were the physical device control plane 204, and the guest partition 202 need not be aware (and typically is not aware) that the exposed physical device control plane 214 is not actually the physical device control plane 204.

Access requests (e.g., read and/or write requests) to the exposed physical device control plane 214 by the guest partition 202 are analyzed by the control module 212 and handled appropriately. The access requests can be analyzed and handled in a variety of different manners. In one or more embodiments, the control module 212 maintains a mapping of addresses in the exposed physical device control plane 214 to addresses in the physical device control plane 204. The control module 212 uses this mapping to translate addresses in address requests received from the guest partition 202 to the appropriate address for the physical device control plane 204.

In one or more embodiments, the control module 212 also applies one or more rules, criteria, and/or algorithms to access requests received from the guest partition 202 to determine whether to allow those access requests to be applied to the physical device control plane 204. These rules, criteria, and/or algorithms can take into account various factors, such as the address of the access request, the program making the request, the physical device, and so forth. For example, the control module 212 can apply one or more rules specifying that one particular program cannot access the physical device control plane 204 but other programs can access the control plane 204.

It should be noted that all of the physical device control plane 204 need not be mapped to the exposed physical device control plane 214. The control plane interface 114 can determine that part of the physical device control plane 204 is not to be accessible to the guest partition 202, and exclude that part of the physical device control plane 204 from the exposed physical device control plane 214. The control plane interface 114 can determine which parts of the physical device control plane 204 are not to be accessible to the guest partition 202 in a variety of different manners, such as being pre-configured with an indication of which parts of the physical device control plane 204 are not to be accessible to the guest partition 202, obtaining an indication of which parts of the physical device control plane 204 are not to be accessible to the guest partition 202 from a remote service (e.g., a service associated with the manufacturer of the physical device, the manufacturer of the computing device 100, and so forth).

As an example, the physical device control plane 204 can be made up of four pages of memory (e.g., four 4 kilobyte blocks of memory). Although examples are discussed herein with references to pages of memory, it should be noted that the techniques discussed herein can be applied to any blocks, regions, chunks, etc. of memory. The control plane interface 114 may determine that pages 1, 3, and 4 of the physical device control plane 204 contain information that is to be accessible to the guest partition 202, but page 2 of the physical device control plane 204 contains information that is not to be accessible to the guest partition 202. In this situation, the exposed physical device control plane 214 includes three pages that are mapped to pages 1, 3, and 4 of the physical device control plane 204, but no page that is mapped to page 2 of the physical device control plane 214. Thus, rather than simply ignoring or not mapping access requests to an address that is not to be accessible to the guest partition 202, the exposed physical device control plane 214 can simply include no address that maps to the address that is not to be accessible to the guest partition 202.

It should also be noted that pages of memory in the exposed physical device control plane 214 can be mapped to pages of the physical device control plane 204 in a non-sequential order. The order in which the pages of memory in the exposed physical device control plane 214 are mapped to pages of the physical device control plane 204 can be determined in a variety of different manners, such as being pre-configured in the control plane interface 114, being obtained from a remote service (e.g., a service associated with the manufacturer of the physical device, the manufacturer of the computing device 100, etc.), and so forth.

For example, the physical device control plane 204 may include memory pages 1, 2, 3, and 4. The exposed physical device control plane 214, however, may map those memory pages into memory pages 3, 2, 4, and 1, respectively. By way of another example, the physical device control plane 204 may include memory pages 1, 3, and 4. The exposed physical device control plane 214, however, may map those memory pages into memory pages 3, 1, and 4, respectively.

Which parts of the physical device control plane 204 the guest partition 202 has direct access to and which parts of the physical device control plane 204 are virtualized can be determined in a variety of different manners. For example, the control plane interface 114 can be pre-configured with an indication of which parts of the physical device control plane 204 the guest partition 202 has direct access to and which parts are virtualized. By way of another example, the control plane interface 114 can obtain an indication of which parts of the physical device control plane 204 the guest partition 202 has direct access to and which parts are virtualized from a remote service (e.g., a service associated with the manufacturer of the physical device, the manufacturer of the computing device 100, and so forth).

At least part of the physical device data plane 206 can be directly accessed by the guest partition 202 as discussed above. In one or more embodiments, at least part of the physical device data plane 206 can be virtualized. In such embodiments, the data plane interface 116 includes a control module 216 and an exposed physical device data plane 218. The physical device data plane 206 is virtualized by the control plane interface 114 making an exposed physical device data plane 218 accessible to the guest partition 202. The exposed physical device data plane 218 appears to the guest partition 202 as if it were the physical device data plane 206, and the guest partition 202 need not be aware (and typically is not aware) that the exposed physical device data plane 218 is not actually the physical device data plane 206.

Access requests (e.g., read and/or write requests) to the exposed physical device data plane 218 by the guest partition 202 are analyzed by the control module 216 and handled appropriately. The access requests can be analyzed and handled in a variety of different manners, analogous to the analyzing and handling performed by the control module 212 discussed above. In one or more embodiments, the control module 216 maintains a mapping of addresses in the exposed physical device data plane 218 to addresses in the physical device data plane 206. The control module 216 uses this mapping to translate addresses in address requests received from the guest partition 202 to the appropriate address for the physical device data plane 206.

Which parts of the physical device data plane 206 the guest partition 202 has direct access to and which parts of the physical device data plane 206 are virtualized can be determined in a variety of different manners. For example, the data plane interface 116 can be pre-configured with an indication of which parts of the physical device data plane 206 the guest partition 202 has direct access to and which parts are virtualized. By way of another example, the data plane interface 116 can obtain an indication of which parts of the physical device data plane 206 the guest partition 202 has direct access to and which parts are virtualized from a remote service (e.g., a service associated with the manufacturer of the physical device, the manufacturer of the computing device 100, and so forth).

It should also be noted that, analogous to the discussion above regarding pages of memory in the exposed physical device control plane 214, pages of memory in the exposed physical device data plane 218 can be mapped to pages of the physical device data plane 206 in a non-sequential order. The order in which the pages of memory in the exposed physical device data plane 218 are mapped to pages of the physical device data plane 206 can be determined in a variety of different manners, such as being pre-configured in the data plane interface 116, being obtained from a remote service (e.g., a service associated with the manufacturer of the physical device, the manufacturer of the computing device 100, etc.), and so forth.

Figure 3:
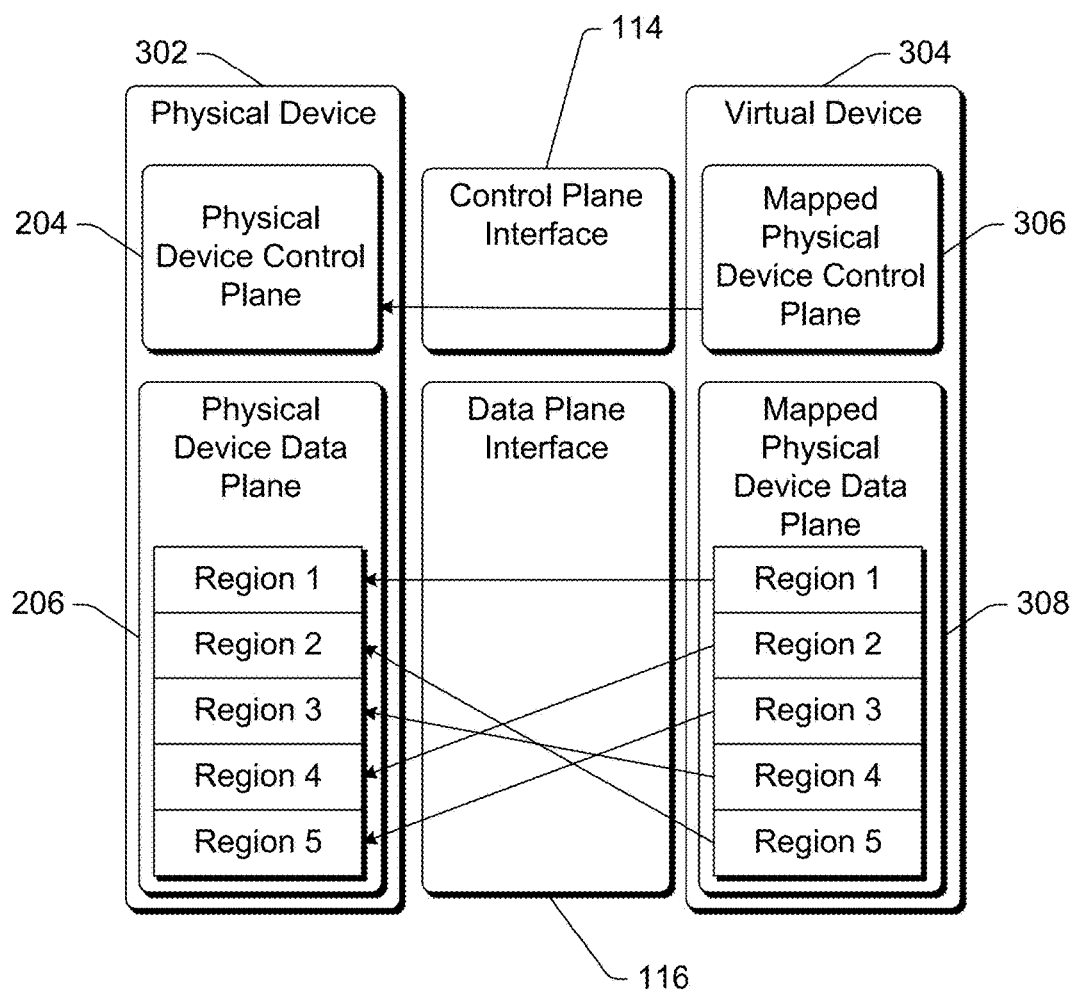
FIG. 3 illustrates an example of mapping pages of the physical device data and control planes to pages of the exposed physical device data and control planes in accordance with one or more embodiments.

FIG. 3 illustrates an example of mapping pages of the physical device data and control planes to pages of the exposed physical device data and control planes in accordance with one or more embodiments. Illustrated in the example of FIG. 3 is a physical device 302 and a virtual device 304. The physical device 302 can be any of physical devices 106 of FIG. 1. The virtual device 304 is a virtualized device that is exposed to a guest partition (e.g., any of guest partitions 104 of FIG. 1). Also illustrated are the control plane interface 114 and the data plane interface 116.

The physical device 302 includes the physical device control plane 204 and the physical device data plane 206. The physical device data plane 206 includes multiple regions, shown as Region 1, Region 2, Region 3, Region 4, and Region 5. The physical device 302 is a memory mapped I/O device, and each of the regions of the physical device data plane 206 is a memory address range that is associated with physical memory of the computing device 100 implementing the control plane interface 114 and the data plane interface 116.

The virtual device 304 includes a mapped physical device control plane 306 and a mapped physical device data plane 308. The mapped physical device control plane 306 is exposed by the control plane interface 114 to guest partitions as the exposed physical device control plane. Similarly, the mapped physical device data plane 308 is exposed by the data plane interface 116 as the exposed physical device data plane.

The mapped physical device control plane 306 is mapped by the control plane interface 114 to memory addresses of the physical device control plane 204 that are associated with the physical device 302. The mapped physical device data plane 308 is mapped by the data plane interface 116 to memory addresses of the physical device data plane 206 that are associated with the physical device 302. The mapped physical device data plane 308 includes multiple regions, shown as Region 1, Region 2, Region 3, Region 4, and Region 5. However, the data plane interface 116 maps the regions of the mapped physical device data plane 308 to regions of the physical device data plane 206 in non-sequential order. As illustrated in FIG. 3, Region 1 of mapped physical device data plane 308 is mapped by the data plane interface 116 to Region 1 of the physical device data plane 206, Region 2 of mapped physical device data plane 308 is mapped by the data plane interface 116 to Region 4 of the physical device data plane 206, Region 3 of mapped physical device data plane 308 is mapped by the data plane interface 116 to Region 5 of the physical device data plane 206, Region 4 of mapped physical device data plane 308 is mapped by the data plane interface 116 to Region 3 of the physical device data plane 206, and Region 5 of mapped physical device data plane 308 is mapped by the data plane interface 116 to Region 2 of the physical device data plane 206.

Figure 4:
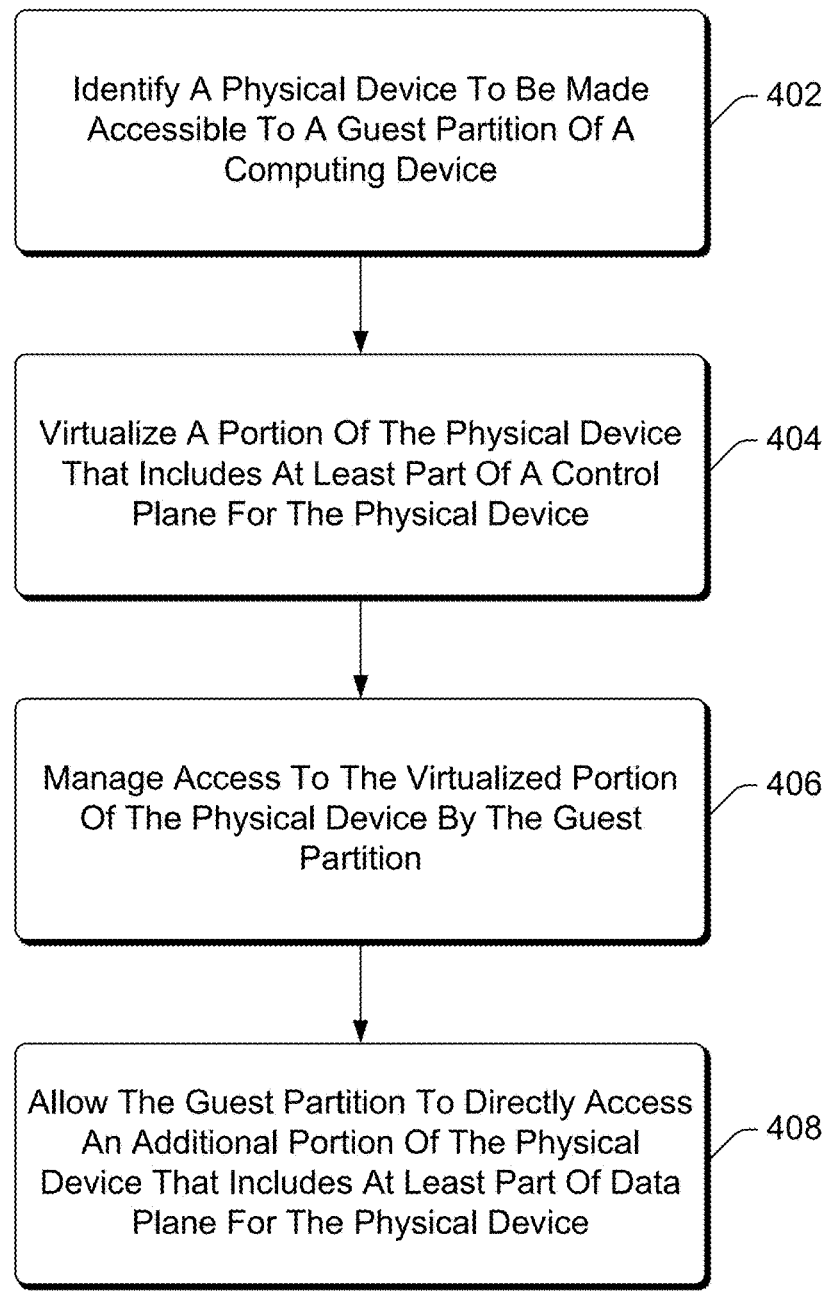
FIG. 4 is a flowchart illustrating an example process for managing guest partition access to physical devices in accordance with one or more embodiments.

FIG. 4 is a flowchart illustrating an example process 400 for managing guest partition access to physical devices in accordance with one or more embodiments. Process 400 is carried out by a device, such as computing device 100 of FIG. 1, and can be implemented in software, firmware, hardware, or combinations thereof. Process 400 is shown as a set of acts and is not limited to the order shown for performing the operations of the various acts. Process 400 is an example process for managing guest partition access to physical devices; additional discussions of managing guest partition access to physical devices are included herein with reference to different figures.

In process 400, a physical device to be made accessible to a guest partition of a computing device is identified (act 402). The physical device can be identified in various manners, such as being pre-configured in a host of the computing device, being obtained from a remote service, and so forth. All physical devices in the computing device may be made accessible to the guest partition, or alternatively less than all of the physical devices in the may be made accessible to the guest partition.

A portion of the physical device that includes at least part of a control plane for the physical device is virtualized (act 404). This virtualization can include mapping different parts of a physical device control plane that is exposed to the guest partition to the control plane of the physical device.

Access to the virtualized portion of the physical device by the guest partition is managed (act 406). This management includes mapping access requests from an exposed physical device control plane to the physical device control plane. Various additional rules or criteria can also be implemented as discussed above to determine whether to perform the received access requests on the physical device.

The guest partition is allowed to directly access an additional portion of the physical device that includes at least part of the data plane for the physical device (act 408). This additional portion is not virtualized, allowing the guest partition faster access to the additional portion of the physical device.

Returning to FIG. 1, it should be noted that the mappings maintained in the control plane interface 114 and/or data plane interface 116 can change over time. These changes can be made during operation of the computing device 100, and multiple such changes can be made in the time span between powering on the computing device 100 and powering off the computing device 100. For example, when the computing device 100 powers on, a first guest partition can be allowed direct access to part of the physical device data plane. At some later time or in response to some event, such as switching to executing a second guest partition, the part of the physical device data plane for which the first guest partition was given direct access can be virtualized. At some further later time or in response to some other event, such as switching to executing the first guest partition again, the first guest partition can again be given direct access to the part of the physical device data plane for which the first guest partition was previously given direct access.

The techniques discussed herein allow a single physical device to be split into multiple virtual devices by virtualizing parts of the physical device while giving direct access to only other parts of the physical device. The guest partitions need not be given full direct access to all of the physical device. By virtualizing at least part of the control plane of a physical device, the part of the control plane accessed by the guest partition is implemented in software or firmware, alleviating the need to have additional hardware to support control planes for multiple guest partitions.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 5:
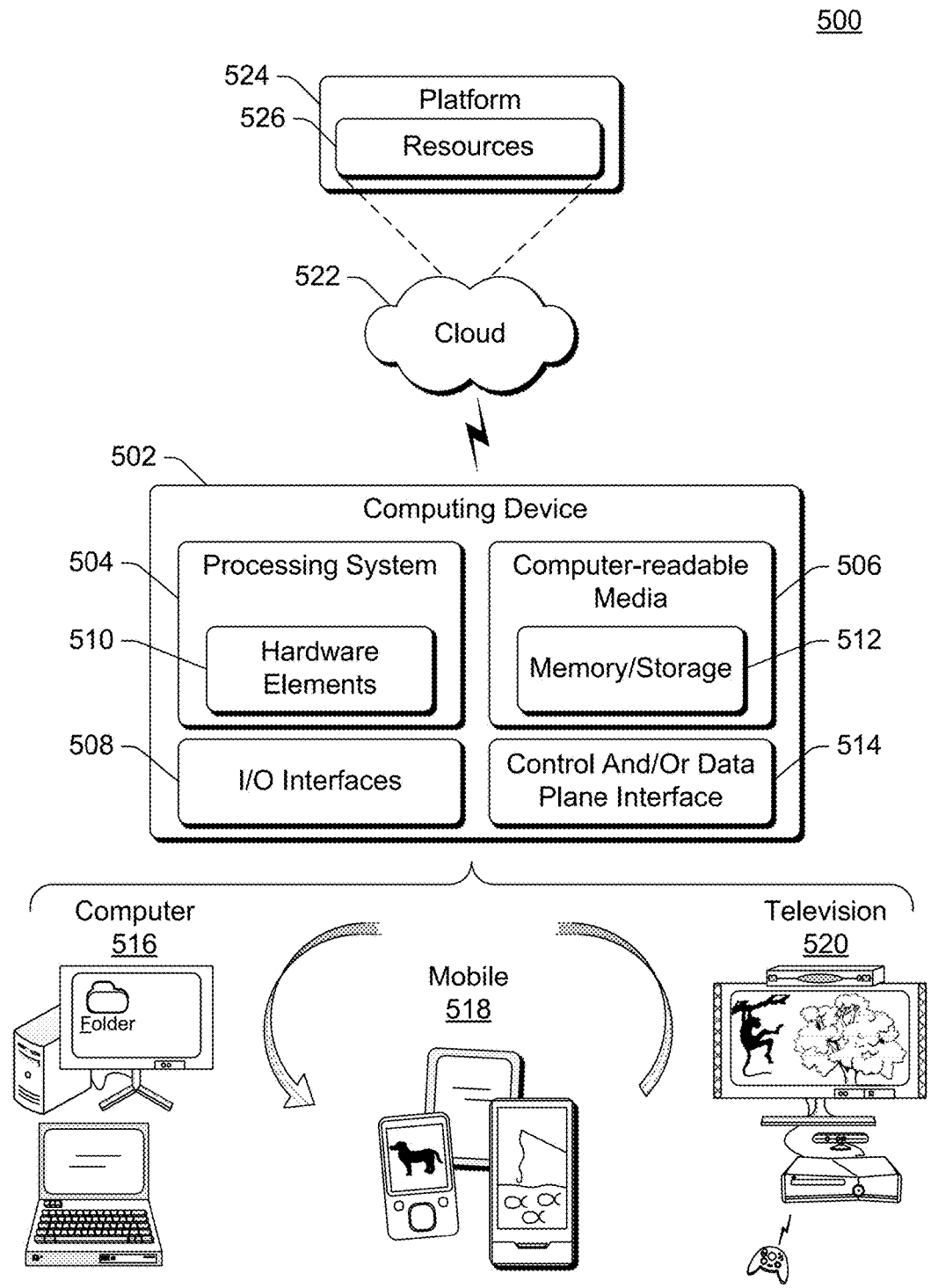
FIG. 5 illustrates an example system that includes an example computing device that is representative of one or more systems and/or devices that may implement the various techniques described herein.

FIG. 5 illustrates an example system generally at 500 that includes an example computing device 502 that is representative of one or more systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O Interfaces 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware elements 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 506 is illustrated as including memory/storage 512. The memory/storage 512 represents memory/storage capacity associated with one or more computer-readable media. The memory/storage 512 may include volatile media (such as random access memory (RAM)) and/or nonvolatile media (such as read only memory (ROM), Resistive RAM (ReRAM), Flash memory, optical disks, magnetic disks, and so forth). The memory/storage 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

The one or more input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 502 may be configured in a variety of ways as further described below to support user interaction.

The computing device 502 also includes a control and/or data plane interface 514. The control and/or data plane interface 514 provides various management of access requests to a physical device by a guest partition, and can be a control plane interface 114 and/or data plane interface 116 of FIG. 1, 2, or 3, as discussed above.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 510 and computer-readable media 506 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of modules as a module that is executable by the computing device 502 as software may be achieved at least partially in hardware, e.g., through use of computer-readable storage media and/or hardware elements 510 of the processing system. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 502 may assume a variety of different configurations, such as for computer 516, mobile 518, and television 520 uses. Each of these configurations includes devices that may have generally different constructs and capabilities, and thus the computing device 502 may be configured according to one or more of the different device classes. For instance, the computing device 502 may be implemented as the computer 516 class of a device that includes a personal computer, desktop computer, a multi-screen computer, laptop computer, netbook, and so on.

The computing device 502 may also be implemented as the mobile 518 class of device that includes mobile devices, such as a mobile phone, portable music player, portable gaming device, a tablet computer, a multi-screen computer, and so on. The computing device 502 may also be implemented as the television 520 class of device that includes devices having or connected to generally larger screens in casual viewing environments. These devices include televisions, set-top boxes, gaming consoles, and so on.

The techniques described herein may be supported by these various configurations of the computing device 502 and are not limited to the specific examples of the techniques described herein. This functionality may also be implemented all or in part through use of a distributed system, such as over a "cloud" 522 via a platform 524 as described below.

The cloud 522 includes and/or is representative of a platform 524 for resources 526. The platform 524 abstracts underlying functionality of hardware (e.g., servers) and software resources of the cloud 522. The resources 526 may include applications and/or data that can be utilized while computer processing is executed on servers that are remote from the computing device 502. Resources 526 can also include services provided over the Internet and/or through a subscriber network, such as a cellular or Wi-Fi network.

The platform 524 may abstract resources and functions to connect the computing device 502 with other computing devices. The platform 524 may also serve to abstract scaling of resources to provide a corresponding level of scale to encountered demand for the resources 526 that are implemented via the platform 524. Accordingly, in an interconnected device embodiment, implementation of functionality described herein may be distributed throughout the system 500. For example, the functionality may be implemented in part on the computing device 502 as well as via the platform 524 that abstracts the functionality of the cloud 522.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method, implemented in a computing device, the method comprising: identifying, in a host of the computing device, a physical device to be made accessible to a guest partition of the computing device; virtualizing a first portion of the physical device for access to the physical device by the guest partition, the first portion including at least part of a control plane for the physical device; managing accesses to the first portion of the physical device by the guest partition; and allowing the guest partition to directly access a second portion of the physical device, the second portion including at least part of a data plane for the physical device.

Alternatively or in addition to any of the above described methods, any one or combination of: the first portion including at least part of the data plane for the physical device; one or more parts of the data plane for the physical device included in the first portion changing during operation of the computing device; the managing access to the first portion of the physical device by the guest partition comprising receiving an access request targeting a first address, the first address being a memory address in an exposed physical device control plane, mapping the first address to a second address, the second address being a memory address in the physical device control plane, and making the access request targeting the second address; the method further comprising determining part of the control plane to include in the first portion, the part of the control plane comprising less than all of the control plane, including the part of the control plane in an exposed physical device control plane but not including other parts of the control plane in the exposed physical device control plane; the method further comprising including, in the exposed physical device control plane, regions mapped to the part of the control plane in non-sequential order; the first portion comprising all of the control plane for the physical device; the method further comprising allowing the guest partition to directly access an additional part of the control plane for the physical device, the additional part of the control plane being a different part than the first portion of the physical device; the guest partition manager comprising a hypervisor; the guest partition manager comprising a host operating system.

A computing device comprising: a control plane interface configured to virtualize a first portion of a physical device for access to the physical device by a guest partition, the first portion including at least part of a control plane for the physical device, the control plane interface being further configured to manage access to the first portion of the physical device by the guest partition; and a data plane interface configured to virtualize a second portion of the physical device for access to the physical device by the guest partition, the second portion including part of a data plane for the physical device, the data plane interface being further configured to manage access to the second portion of the physical device by the guest partition, and allow the guest partition to directly access parts of the data plane that are not included in the second portion.

Alternatively or in addition to any of the above described computing devices, any one or combination of: one or more parts of the data plane for the physical device included in the second portion changing during operation of the computing device; the control plane interface being further configured to expose to the guest partition an exposed physical device control plane, the exposed physical device control plane mapping to part of the control plane of the physical device that is less than all of the control plane of the physical device; the exposed physical device control plane including regions mapped to the part of the control plane of the physical device in non-sequential order.

A computing device comprising: a processor; a physical device; and a computer-readable storage medium having stored thereon multiple instructions that, responsive to execution by the processor, cause the processor to: virtualize a first portion of the physical device for access to the physical device by the guest partition, the first portion including at least part of a control plane for the physical device; manage accesses to the first portion of the physical device by the guest partition; and allow the guest partition to directly access a second portion of the physical device, the second portion including at least part of a data plane for the physical device.

Alternatively or in addition to any of the above described computing devices, any one or combination of: the first portion including at least part of the data plane for the physical device; one or more parts of the data plane for the physical device included in the first portion changing during operation of the computing device; wherein to manage access to the first portion of the physical device by the guest partition is to receive an access request targeting a first address, the first address being a memory address in an exposed physical device control plane, map the first address to a second address, the second address being a memory address in the physical device control plane, and make the access request targeting the second address; the multiple instructions further causing the processor to determine part of the control plane to include in the first portion, the part of the control plane comprising less than all of the control plane, and include the part of the control plane in an exposed physical device control plane but not including other parts of the control plane in the exposed physical device control plane; the multiple instructions further causing the processor to include, in the exposed physical device control plane, regions mapped to the part of the control plane in non-sequential order.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, implemented in a computing device comprising a memory space, the method comprising:
    identifying, in a host of the computing device, a physical device to be made accessible to a guest partition of the computing device, the physical device comprising a memory-mapped I/O device where first and second portions of the physical device are mapped to first and second regions of the memory space, respectively;
    virtualizing, by the host of the computing device, the first portion of the physical device for indirect access to the physical device by the guest partition, the first portion including at least part of a control plane for the physical device, the virtualizing providing an exposed control plane available to guest partitions through the host;
    the virtualizing comprising intermediating, by the host of the computing device, accesses to the first portion of the physical device by the guest partition, wherein the guest partition interfaces with the exposed control plane, and wherein the host virtualizes access to the control plane by mapping the accesses between the first portion and the first memory region; and
    allowing the guest partition to directly access the non-virtualized second portion of the physical device, the non-virtualized second portion including at least part of a data plane for the physical device, wherein the guest partition directly accesses the second portion by directly accessing the second memory region.

2. The method as recited in claim 1, the first portion including at least part of the data plane for the physical device.

3. The method as recited in claim 2, wherein one or more parts of the data plane for the physical device included in the first portion change during operation of the computing device.

4. The method as recited in claim 1, the virtualizing access to the first portion of the physical device by the guest partition comprising:
   receiving an access request targeting a first address, the first address being a memory address in an exposed physical device control plane;
   mapping the first address to a second address, the second address being a memory address in the physical device control plane; and
   implementing the access request targeting the second address.

5. The method as recited in claim 1, further comprising:
   determining part of the control plane to include in the first portion, the part of the control plane comprising less than all of the control plane;
   including the part of the control plane in an exposed physical device control plane but not including other parts of the control plane in the exposed physical device control plane.

6. The method as recited in claim 5, further comprising including, in the exposed physical device control plane, regions mapped to the part of the control plane in nonsequential order.

7. The method as recited in claim 1, the first portion comprising all of the control plane for the physical device.

8. The method as recited in claim 1, further comprising allowing the guest partition to directly access an additional part of the control plane for the physical device, the additional part of the control plane being a different part than the first portion of the physical device.

9. The method as recited in claim 1, the guest partition manager comprising a hypervisor.

10. The method as recited in claim 1, the guest partition manager comprising a host operating system.

11. A computing device comprising:
    a bus;
    a processor;
    a physical device in communication with the memory via the bus;
    memory storing:
       a host layer configured to manage the execution of guest partitions and to virtualize access, by the guest partitions, to the processor and memory;
       the host layer comprising a control plane interface exposed to the guest partitions and configured to virtualize a first portion of a physical device for indirect virtualized access to the first portion of the physical device by a guest partition, the first portion including at least part of a control plane for the physical device, the control plane interface being further configured to manage access to the first portion of the physical device by the guest partition; and
       the host layer further comprising a data plane interface exposed to the guest partitions and configured to virtualize a second portion of the physical device for indirect virtualized access to the second portion of the physical device by the guest partition, the second portion including part of a data plane for the physical device, the data plane interface being further configured to manage indirect access to the second portion of the physical device by the guest partitions, wherein the host layer is further configured to allow the guest partition to directly access non-virtualized parts of the data plane that are not included in the second portion.

12. The computing device as recited in claim 11, one or more parts of the data plane for the physical device that are included in the second portion change during operation of the computing device.

13. The computing device as recited in claim 11, the control plane interface being further configured to expose to the guest partition an exposed physical device control plane, the exposed physical device control plane mapping to part of the control plane of the physical device that is less than all of the control plane of the physical device.

14. The computing device as recited in claim 13, the exposed physical device control plane including regions mapped to the part of the control plane of the physical device in non-sequential order.

15. A computing device comprising:
    a processor;
    a physical device; and
    a computer-readable storage medium having stored thereon multiple instructions that, responsive to execution by the processor, cause the processor to:
       execute a host that manages execution of a guest partition;
       virtualize, by the host, a first portion of the physical device for indirect virtualized access to the first portion of the physical device by the guest partition, the first portion including at least part of a control plane for the physical device;
       manage, by the host, indirect virtualized accesses to the first portion of the physical device by the guest partition; and
       allow the guest partition to directly access a non-virtualized second portion of the physical device, the non-virtualized second portion including at least part of a data plane for the physical device.

16. The computing device as recited in claim 15, the first portion including at least part of the data plane for the physical device.

17. The computing device as recited in claim 16, wherein one or more parts of the data plane for the physical device included in the first portion change during operation of the computing device.

18. The computing device as recited in claim 15, wherein the managing access to the first portion of the physical device by the guest partition comprises:
    receiving an access request targeting a first address, the first address being a memory address in an exposed physical device control plane;
    mapping the first address to a second address, the second address being a memory address in the physical device control plane; and
    implementing the access request that targets the second address.

19. The computing device as recited in claim 15, the multiple instructions further causing the processor to:
    determine part of the control plane to include in the first portion, the part of the control plane comprising less than all of the control plane; and
    include the part of the control plane in an exposed physical device control plane but not including other parts of the control plane in the exposed physical device control plane.

20. The computing device as recited in claim 19, the multiple instructions further causing the processor to include, in the exposed physical device control plane, regions mapped to the part of the control plane in non-sequential order.

\* \* \* \* \*